United States Patent [19]

Utton et al.

[11] Patent Number: 4,509,709

[45] Date of Patent: Apr. 9, 1985

[54] SWINGING POD ANTENNA MOUNT

[75] Inventors: Charles G. Utton, Mesa, Ariz.; Bill D. Stratman, Pomona, Calif.

[73] Assignee: Motorola, Inc., Schaumburg, Ill.

[21] Appl. No.: 467,707

[22] Filed: Feb. 18, 1983

[51] Int. Cl.³ .............................................. B64C 1/36
[52] U.S. Cl. .............................. 244/118.1; 244/137 R; 343/705
[58] Field of Search ............. 244/118.1, 129.1, 137 A, 244/101; 343/705, 708, 711, 713, 714, 716, 717, 878

[56] References Cited

U.S. PATENT DOCUMENTS

| | | | |
|---|---|---|---|
| 1,106,020 | 8/1914 | Wilds | 244/101 |
| 1,779,801 | 10/1930 | Carroll | 244/101 |
| 1,929,630 | 10/1933 | Duell | 244/101 |
| 2,984,834 | 5/1961 | Howard, Jr. et al. | 343/705 |
| 3,778,011 | 12/1973 | Cannon | 244/118.1 |
| 3,904,155 | 9/1975 | Chavis | 244/118.1 |
| 4,002,313 | 1/1977 | Blank, Sr. et al. | 244/118.1 |

FOREIGN PATENT DOCUMENTS 700106 11/1953 United Kingdom ............... 343/705

Primary Examiner—Trygve M. Blix
Assistant Examiner—Rodney Corl
Attorney, Agent, or Firm—Lowell W. Gresham

[57] ABSTRACT

Antenna pods are located outboard of each wheel fairing on a C-130 aircraft, which pods are supported by truss members attached to the aircraft and pivotally affixed to an upper row of antenna lugs and two travelling nut jack screw units affixed to the aircraft and pivotally attached to two lower antenna lugs. When the jack screws are longitudinally extended the antenna pod is pivoted out of an operating position and into a maintenance position.

6 Claims, 4 Drawing Figures

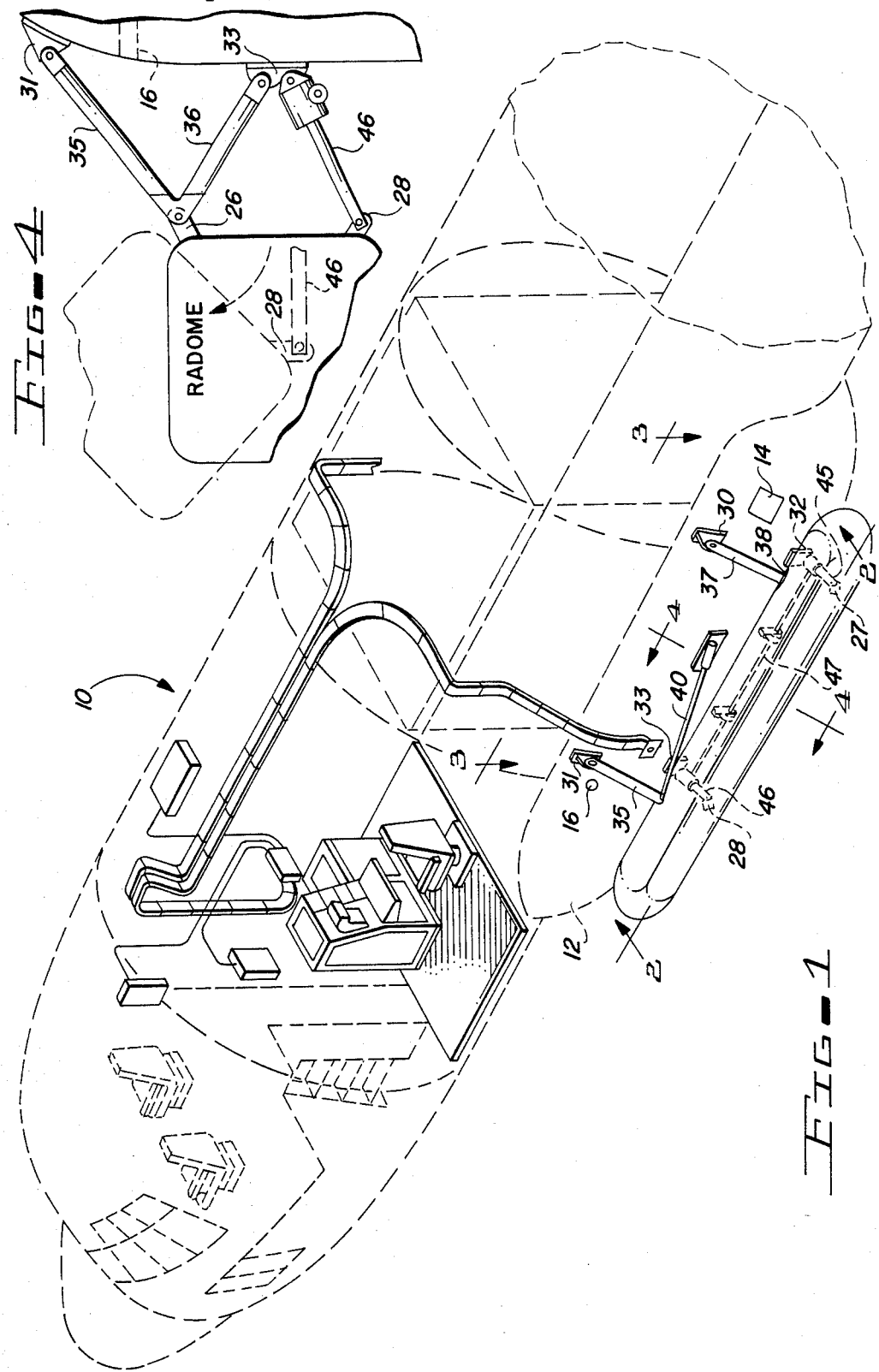

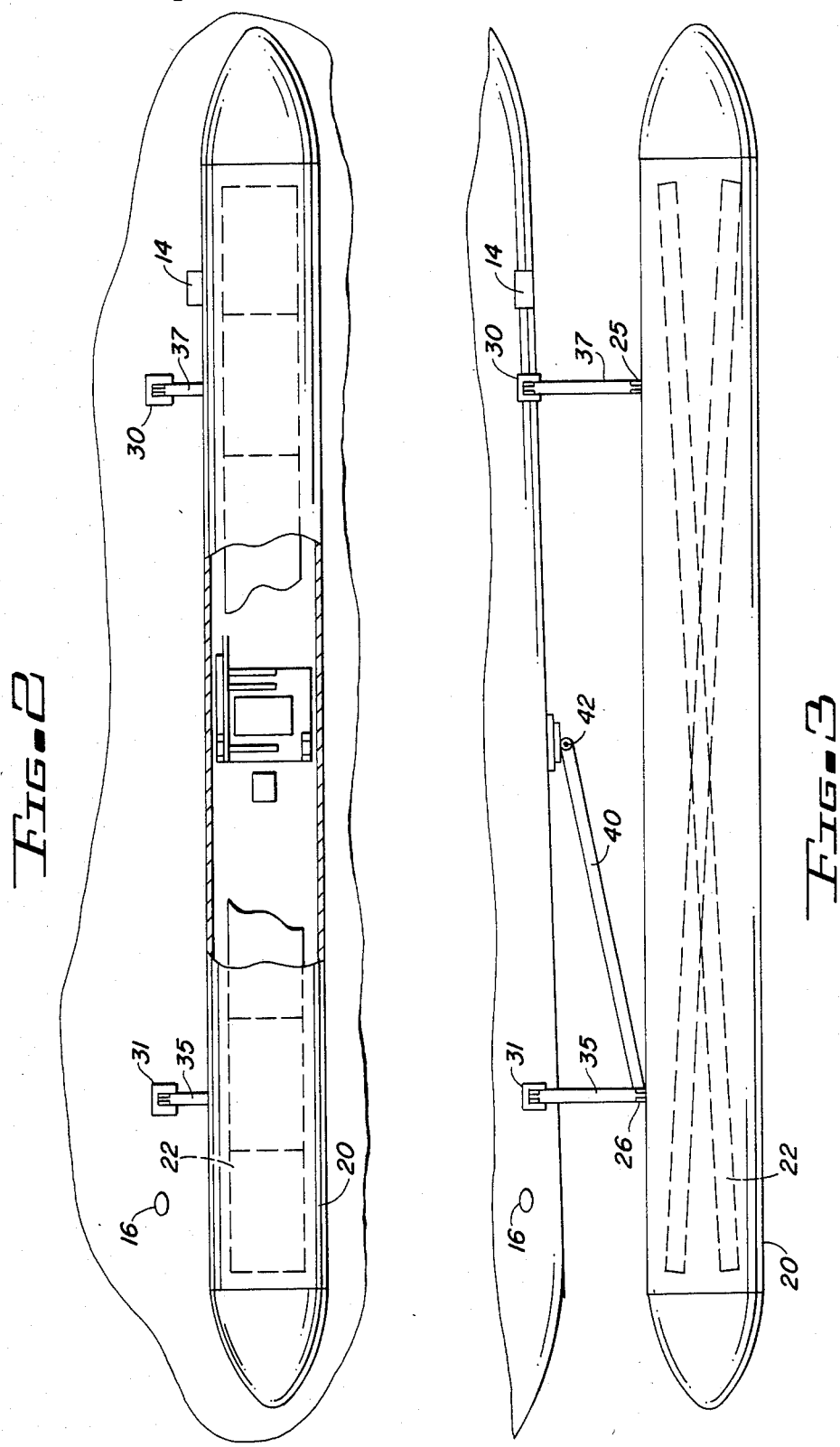

SWINGING POD ANTENNA MOUNT

BACKGROUND OF THE INVENTION

In many instances when antenna pods are attached to vehicles, such as airplanes and the like it may be necessary to move the pods from an operating position into a different position for maintenance of the antenna or the vehicle. For example, antenna pods for side looking radars may be as large as twenty foot long and approximately a two foot square cross section. Mounting these antenna pods on an airplane, such as a C-130 can be extremely difficult. Structurally, and for purposes of the most efficient operation, the antenna pods are located outboard of the wheel fairings. However, the antenna pods must be located sufficiently far away from the wheel fairings to allow complete access to the single point refueling connection. Further, the antenna pods must be low enough, vertically on the wheel fairings to be clear of 1200° Fahrenheit exhaust gas temperatures from an auxiliary power unit to avoid damage to the fiberglass antenna pod. The low vertical position precludes damage due to the high temperature exhaust, however the landing gear door cannot be fully opened to allow clearance for maintenance, such as tire changes and the like.

SUMMARY OF THE INVENTION

The subject invention pertains to a swinging pod antenna mount for use on vehicles, such as airplanes and the like, wherein an elonagated antenna pod is designed to be mounted with its longitudinal axis parallel to the vehicle direction of travel and the mount includes a plurality of mounting lugs affixed to the pod to define a first line parallel with the longitudinal axis of the pod and to define a second line spaced vertically from the first line and parallel with the longitudinal axis of the pod, a plurality of struts each affixed adjacent one end to said vehicle and adjacent the other end to one of the lugs defining the first line, the struts being affixed to the lugs for pivotal movement of said pod about the first line, and a longitudinally extendable member affixed adjacent one end to the vehicle and affixed adjacent the other end to one of the lugs defining the second line for pivotal movement of the pod about the first line as the extendable member is longitudinally extended, whereby the pod moves from an operating position to a maintenance position.

It is an object of the present invention to provide a new and improved swinging pod antenna mount.

It is another object of the present invention to provide a swinging pod antenna mount which is easily moveable from an operating position to a maintenance position.

These and other objects of the invention will become apparent to those skilled in the art upon consideration of the accompanying specification, claims and drawings.

BRIEF DESCRIPTION OF THE DRAWINGS

Referring to the drawings wherein like characters indicated like parts throughout the figures;

FIG. 1 is a partial view in perspective of an aircraft having an antenna pod mounted to a wheel fairing thereof with a mount embodying the present invention;

FIG. 2 is an enlarged view as seen from the line 2—2 in FIG. 1;

FIG. 3 is an enlarged view as seen from the line 3—3 in FIG. 1; and

FIG. 4 is a greatly enlarged view as seen from the line 4—4 in FIG. 1, illustrating the antenna pod in the operating position in full lines and in the maintenance position in dotted lines.

DESCRIPTION OF THE PREFERRED EMBODIMENT

Referring specifically to FIG. 1, a vehicle, which in this embodiment is a C-130 aircraft, is generally designated 10. FIG. 1 is a view in perspective of the vehicle 10 and, therefore, only the left side of the vehicle is illustrated. The following description is that of a side-looking-radar antenna mounted to the left side of the vehicle 10. It will of course be understood by those skilled in the art that a similar side-looking-radar antenna is, or could be, attached to the right side of the vehicle 10 in a similar fashion. However, only the illustrated left side of the vehicle will be described for convenience.

The vehicle 10 has a wheel fairing 12 extending generally outwardly and downwardly from the side of the body of vehicle 10. The vehicle 10 has a single point refueling connection 14 located in the left wheel fairing 12 aft of the mounting structure. Also, an exhaust 16 for an auxiliary power unit located within the vehicle is positioned near the upper edge of the wheel fairing 12 so as to direct the hot exhaust gases generally perpendicularly outward from the upper edge of the wheel fairing 12. Because of the structural limitations of the vehicle 10 any side looking radar antenna which is attached thereto must be attached to the wheel fairing 12 and must be affixed thereto so that the main lobe of the radar does not encounter interference from any portion of the vehicle 10. Further, the single point refueling connection 14 must be accessible and the radar antenna and components thereof must not be damaged by the hot gases from the exhaust 16 of the auxiliary power unit.

An elongated fiber glass antenna pod 20 encloses a side-looking-radar antenna 22. The antenna will not be discussed in detail since it does not form a portion of this invention. In this particular application, the antenna pod 20 is a relatively large structure, because of the size of the side-looking-radar antenna 22, with the pod 20 approaching 20 feet in length and a 2 foot square cross section. Because of the size of the antenna pod 20, four mounting lugs 25, 26, 27 and 28 are utilized. It will of course be understood that larger pods might require additional mounting lugs and smaller pods might require fewer mounting lugs but the number in the present embodiment is selected for ease of explanation of the operation thereof. The two mounting lugs 25 and 26 are affixed adjacent and upper edge of the antenna pod 20 to define a first line parallel with the longitudinal axis of the antenna pod 20. The two lugs 27 and 28 (see FIGS. 1 and 4) are positioned adjacent a lower edge of the antenna pod 20 to define a second line parallel with the longitudinal axis of the antenna pod 20.

Four mounting brackets 30, 31, 32 and 33 are affixed to the wheel fairing 12 of the vehicle 10. A pair of struts 35 and 36 are connected together at one end to form a V shaped truss and the free ends of the struts 35 and 36 are attached to the brackets 31 and 33 by some convenient means such as bolts or the like. The junction of the struts 35 and 36, or arms of the V, is pivotally attached to the antenna lugs 26 by some means, such as a bolt or the like. The struts 35 and 36 are sufficiently long to space the antenna pod 20 from the wheel fairing 12 (approximately 18½ inches in this embodiment) to allow complete access to the single point refueling connection 14. A second pair of struts 37 and 38 form a second truss connected between the brackets 30 and 32 and the antenna lug 25. In addition, longitudinal loads are reacted to the vehicle 10 by a drag strut 40, which is connected from the top antenna lug 26 to a bracket 42 on the wheel fairing 12 midway between the four brackets 30, 31, 32 and 33. In this particular embodiment the struts 35, 36, 37, 38 and 40 are fabricated from 4130 steel aerodynamic tubing.

A pair of longitudinally extendable members, which in this embodiment are traveling nut jack screw units 45 and 46 are positioned between bracket 32 and antenna lug 27 and between bracket 33 and antenna lug 28, respectively. The jack screw units 45 and 46 are driven by a standard ¾ inch socket and in this embodiment the two jack screw units 45 and 46 are actuated simultaneously by means of a shaft 47 (see FIG. 1) which couples the two units. The jack screw units 45 and 46 form a third leg of the truss which positions the antenna pod in spaced apart relationship from the wheel fairing 12. Referring to FIG. 4, the antenna pod 20 is illustrated in the operating position in full lines and in a maintenance position in dotted lines. In the dotted line position the jack screw units 45 and 46 are activated so as to be longitudinally extended, which causes the antenna pod 20 to rotate 45 degrees upwardly about the first line, defined by the antenna lugs 25 and 26. In the operating position the longitudinal axis of the antenna pod 20 is parallel to the direction of travel of the vehicle 10 and the line defined by the lugs 25 and 26 is spaced vertically above the second line defined by the lugs 27 and 28. The antenna pod 20 is required to be positioned low enough, vertically, on the wheel fairing 12 to be clear of the 1200 degree Fahrenheit exhaust gas from the exhaust 16. The low vertical position precludes damage due to the high temperature exhaust, but the landing gear door (not shown) cannot be fully opened to allow clearance for maintenance, such as tire changes and the like. When the jack screw units 45 and 46 are longitudinally extended to rotate the antenna pod 20 upwardly 45 degrees into the maintenance position, the landing gear door is clear to open fully for complete access for tire changes and other maintenance. While the rotation of the antenna pod 20 is provided for maintenance to the landing gear in the present embodiment, in many instances the rotation into a maintenance position may be required for maintenance of the antenna itself.

In the present embodiment a microswitch is provided in the internal circuitry to render the auxiliary power unit inoperative when the antenna pod 20 is positioned in all but the full down (operational) position. This feature prevents damage to the antenna pod 20 due to the high temperature exhaust when the antenna pod is not in the operational position. The microswitch is wired into the normal auxiliary power shut down and start up circuitry.

Thus, a swinging pod antenna mount is disclosed which mounts the antenna pod to a vehicle for normal usage thereof in an operational position and which swings the antenna into a maintenance position for maintenance of either the vehicle or the antenna itself. The novel antenna pod mount enables antenna pods to be mounted on, for example, a C-130 airplane equipped with an auxiliary power unit and allows the antennas to be placed in a low position to avoid the hot exhaust gases of the auxiliary power unit and radar reflections off the wings while not limiting access to the wheelwells or landing gear.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. A swinging pod antenna mount for use on vehicles, such as airplanes and the like, comprising:
    an elongated antenna pod designed to be mounted with its longitudinal axis parallel to the vehicle's direction of travel;
    a plurality of mounting lugs affixed to said pod to define a first line parallel with the longitudinal axis of said pod and to define a second line spaced vertically from the first line and parallel with the longitudinal axis of said pod;
    a plurality of struts each affixed adjacent one end to said vehicle and adjacent the other end to one of said lugs defining the first line, said struts being affixed to said lugs for pivotal movement of said pod about the first line and so that the first line is spaced from the vehicle a predetermined amount and parallel with the vehicle's direction of travel; and
    a longitudinally extendable member affixed adjacent one end to the vehicle and affixed adjacent the other end to one of said lugs defining the second line for pivotal movement of said pod about the first line between an operating position, when said extendable member is retracted, and a maintenance position, when said extendable member is fully extended longitudinally.

2. A swinging pod antenna mount as claimed in claim 1 wherein the mounting lugs are affixed to the antenna pod so that the first line is positioned vertically above the second line in the operating position.

3. A swinging pod antenna mount as claimed in claim 2 wherein two, longitudinally spaced apart mounting lugs define the second line and a longitudinally extendable member is mounted between the vehicle and each of said two lugs, said longitudinally extendable members being connected to operate from a single control.

4. A swinging pod antenna mount as claimed in claim 2 wherein the longitudinally extendable member is a traveling nut jack screw unit.

5. A swinging pod antenna mount for use on vehicles, such as airplanes and the like, comprising:
    an elongated antenna pod designed to be mounted with its longitudinal axis parallel to the vehicle's direction of travel;
    two upper mounting lugs affixed to said pod to define a first line parallel with the longitudinal axis of said pod and two lower mounting lugs affixed to said pod to define a second line spaced vertically below the first line and parallel with the longitudinal axis of said pod;
    two V shaped trusses each having the ends of the arms attached to the vehicle and the junction of the arms pivotally attached to different ones of said upper mounting lugs, said trusses being mounted to allow pivotal movement of said pod about the first line and so that the first line is spaced from the vehicle a predetermined amount and parallel with the vehicle's diection of travel; and two traveling nut jack screw units each having one end attached to the vehicle and the other end attached to different ones of said two lower mounting lugs for pivotal movement of said pod about the first line from an operating position, wherein the second line is spaced vertically below the first line, to a maintenance position, wherein the jack screw units are fully extended longitudinally.

6. A radar equipped airplane having a body elongated in a direction of travel, said airplane comprising:

a wheel fairing extending outwardly from the body of the airplane, said wheel fairing having a refueling connection and an auxiliary power unit exhaust located thereon;

an elongated side-looking-radar antenna pod designed to be mounted with its longitudinal axis parallel to the airplane's direction of travel;

two upper mounting lugs affixed to said pod to define a first line parallel with the longitudinal axis of said pod and two lower mounting lugs affixed to said pod to define a second line spaced vertically below the first line and parallel with the longitudinal axis of said pod;

two V shaped trusses each having the ends of the arms attached to said wheel fairing and the junction of the arms pivotally attached to different ones of said upper mounting lugs, said trusses being mounted to allow pivotal movement of said pod about the first line and so that the first line is spaced from the vehicle a predetermined amount and parallel with the airplane's direction of travel; and two traveling nut jack screw units each having one end attached to the wheel fairing and the other end attached to different ones of said two lower mounting lugs for pivotal movement of said pod about the first line from an operating position wherein the refueling connection is unobstructed and wherein damage to said pod from exhaust gasses exiting the auxiliary power unit exhaust is prevented, to a maintenance position wherein clearance for maintenance on said wheel fairing is provided.

* * * * *